US012638101B2

(12) United States Patent (10) Patent No.: US 12,638,101 B2
Bonnet et al. (45) Date of Patent: May 26, 2026

(54) DRAIN PROVIDED WITH A DISENGAGEMENT DEVICE

(71) Applicant: Safran Aerosystems, Plaisir (FR)

(72) Inventors: Olivier Bonnet, Moissy-Cramayel (FR); Jacques Courbon, Moissy-Cramayel (FR)

(73) Assignee: Safran Aerosystems, Plaisir (FR)

( * ) Notice: Subject to any disclaimer, the term of this patent is extended or adjusted under 35 U.S.C. 154(b) by 0 days.

(21) Appl. No.: 19/126,537

(22) PCT Filed: Jul. 24, 2023

(86) PCT No.: PCT/EP2023/070470

§ 371 (c)(1),
(2) Date: May 1, 2025

(87) PCT Pub. No.: WO2024/099603

PCT Pub. Date: May 16, 2024

(65) Prior Publication Data

US 2026/0002608 A1      Jan. 1, 2026

(30) Foreign Application Priority Data

Nov. 9, 2022    (FR) ...................................... 2211664

(51) Int. Cl.
F16K 31/528          (2006.01)
(52) U.S. Cl.
CPC ................................. F16K 31/5286 (2013.01)
(58) Field of Classification Search
CPC .. F16K 31/523; F16K 31/528; F16K 31/5286; F16K 35/027; F16K 35/06; B64D 37/20
See application file for complete search history.

(56) References Cited

U.S. PATENT DOCUMENTS 4,351,355 A * 9/1982 Koller ..................... F16K 43/00
137/329.06
4,619,437 A 10/1986 Williams et al.
(Continued)

FOREIGN PATENT DOCUMENTS

CN       209195565 U     8/2019
CN       114096774 A     2/2022
(Continued)

OTHER PUBLICATIONS

International Application No. PCT/EP2023/070470, International Preliminary Report on Patentability mailed on May 22, 2025, 16 pages (9 pages of original document and 7 pages of English Translation).
(Continued)

*Primary Examiner* — Hailey K. Do
(74) *Attorney, Agent, or Firm* — Kilpatrick Townsend & Stockton LLP

(57)          ABSTRACT

The invention relates to a drain comprising:
  a body having at least one fluid intake opening and at least one fluid discharge opening,
  a valve provided with at least one lug, and
  a disengagement device comprising:
    a fixed guide, able to be mounted so as to be fixed with respect to a body,
    a movable guide, comprising at least one housing for receiving the lug,
    the fixed guide and/or the movable guide comprising at least one projection and/or at least one recess, in particular having a shape complementary to the projection, and
  pressure spring, able to bias the movable guide against the fixed guide so that the projection cooperates with the recess.

12 Claims, 5 Drawing Sheets

(56)                           References Cited

U.S. PATENT DOCUMENTS

| | | | | |
|---|---|---|---|---|
| 4,880,029 | A  * | 11/1989 | Koller .................. | F16K 31/528 |
| | | | | 251/291 |
| 10,994,858 | B2 * | 5/2021 | Dufaure ................ | B64D 37/34 |
| 11,814,188 | B2 * | 11/2023 | Barnes ................... | F16L 37/40 |
| 2008/0315038 | A1 * | 12/2008 | Wyatt .................... | F16K 1/443 |
| | | | | 244/135 R |

FOREIGN PATENT DOCUMENTS

| | | | |
|---|---|---|---|
| EP | 3193061 | A1 | 7/2017 |
| EP | 3754238 | A1 | 12/2020 |
| FR | 2987614 | A1 | 9/2013 |

OTHER PUBLICATIONS

China Patent Application No. 2023800751652, Office Action, dated Sep. 7, 2025, 8 pages.
International Appl. No. PCT/EP2023/070470, International Search Report and Written Opinion with English Translations, dated Oct. 9, 2023, 17 pages.

* cited by examiner

DRAIN PROVIDED WITH A DISENGAGEMENT DEVICE

CROSS REFERENCE TO RELATED APPLICATIONS

This application is a U.S. national phase under 35 U.S.C. § 371 of International Patent Application No. PCT/EP2023/070470, filed on Jul. 24, 2023, which claims priority to French Patent Application No. 2211664, filed on Nov. 9, 2022, the entire contents of both of which are incorporated herein by reference in their entireties.

The present invention relates to a drain provided with a disengaging device, which can be actuated in the event of overtorque likely to occur during a drainage operation or during a seal change operation in the drain. The invention finds a particularly advantageous application in the field of aircraft tanks, such as airplane or helicopter tanks.

The function of such a drain is in particular to allow the evacuation of condensates and/or pollutants having a density greater than kerosene in the lower part of a tank.

In a manner known per se, the drain comprises a body having at least one fluid inlet opening and one fluid discharge opening, in particular for draining the reservoir. For this purpose, the drain comprises a valve mounted so as to move in translation and rotation relative to the body.

The drain is in particular able to take a closed position, in which a valve head closes the fluid discharge opening, and an open position, in which the valve head is pushed back relative to the fluid discharge opening in order to allow fluid to pass through the drain, in particular for draining the reservoir.

A transition from the closed position to the open position in order to drain the tank is carried out manually firstly by axially pushing the valve so as to push the valve head in translation from the discharge opening, for the drainage, then secondly by rotating the valve by a fraction of a turn.

During the axial pushing process, a toe of the valve comes out of a housing in the body then, after rotation, the toe bears against an end face of the body in order to maintain the valve in a stable open position.

The drain is closed by reverse rotation, a return spring ensuring that the valve moves to the closed position.

There is also a maintenance position for replacing a seal around the valve head.

A state-of-the-art drain is reliable if an operator follows the operating instructions. However, if an operating instruction is not followed during an opening phase, the operator may apply an uncontrolled torque to the valve without first moving it in translation. Applying such a torque while the valve toe is still in the housing causes it to break.

Since a drainage operation is carried out on a full tank, a breakdown of the internal mechanism of the drain requires a maintenance shutdown. During such a shutdown, the tanks concerned are completely emptied, at least one "manhole" is opened in order to allow an operator to pass therethrough for inspecting the tank, and several maintenance operators with special equipment intervene to dismantle and extract the faulty drain in order to replace it with a new one. It is then necessary to close the "manhole" and carry out leak tests on the tank and the drain.

The operations described above are lengthy and require the aircraft to be immobilized until they are entirely carried out.

The objective of the invention is to effectively remedy the aforementioned drawbacks by proposing a drain comprising:

a body having at least one fluid inlet opening and at least one fluid discharge opening, in particular for draining the reservoir, and a valve mounted so as to move in translation and in rotation relative to the body, the valve comprising at least one toe.

In addition, the drain further comprises a disengaging device comprising:

a fixed guide, capable of being mounted so as to be fixed relative to the body, a movable guide, comprising at least one receiving housing for the toe, the fixed guide and/or the movable guide comprising at least one projection and/or at least one recess, in particular whose shape is complementary to that of the projection, and a pressure spring, able to urge the movable guide against the fixed guide so that the projection cooperates with the recess.

Thus, the pressure spring is able to be compressed so as to allow the movable guide to rotate relative to the fixed guide, when an overtorque is applied to the valve while the toe is still inside the receiving housing. Thanks to the disengaging device which is actuated before the operator applies a critical torque likely to damage the drain, the invention thus permits to prevent the valve toe from being put under tension and therefore to prevent the internal mechanism of the drain from being broken due to an incorrect operation by the operator.

According to one embodiment of the invention, a return spring is arranged between a shoulder of the valve and the movable guide.

Furthermore, the fixed guide may comprise an annular portion, the recess being made in one end of the annular portion of the fixed guide.

In addition, the fixed guide may comprise at least one projecting portion for cooperating with a slot of corresponding shape in the body.

According to one embodiment of the invention, an external face of the annular portion of the fixed guide and an internal face of the body respectively comprise a first groove and a second groove facing each other.

In such a configuration, a rod is able to cooperate with the first groove and the second groove.

Furthermore, the movable guide comprises a cylindrical portion inserted into a hollow internal space in the fixed guide and comprising the receiving housing for the toe.

According to this embodiment of the invention, the movable guide comprises an annular shoulder extending radially from an external face of the cylindrical portion.

In such a configuration, the projection is made on an upper face of the annular shoulder of the movable guide.

In addition, the cylindrical portion of the movable guide comprises at least one through opening angularly offset relative to the receiving housing for the toe, in particular so as to allow the valve to pass into a maintenance position.

The invention also relates to an aircraft tank comprising a drain as previously defined and an aircraft comprising such an aircraft tank.

The invention will be better understood and other characteristics and advantages will appear by reading the following detailed description, which includes embodiments given for illustrative purposes with reference to the accompanying figures, presented as way of non-limiting examples, which may serve to complete the understanding of the present invention and the description of its implementation and eventually contribute to its definition, wherein.

Figure 3A:
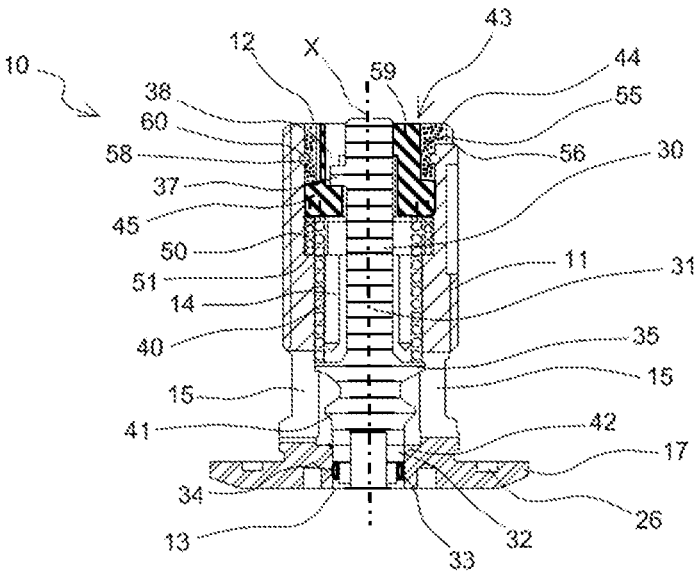
Figure 3B:
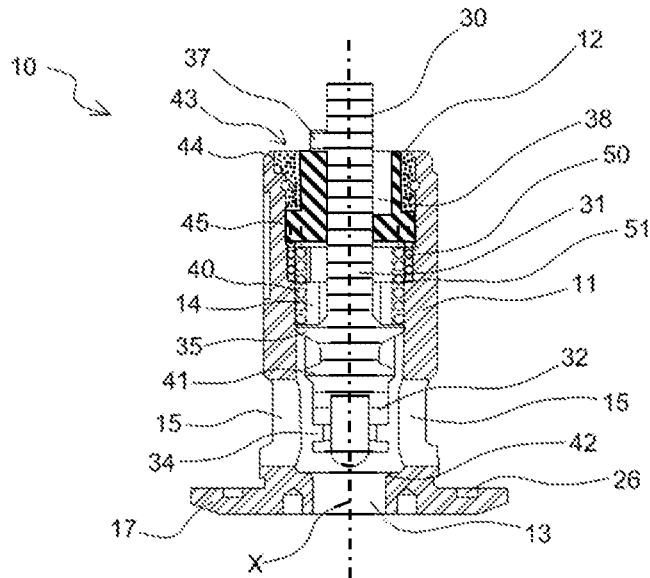
Figure 3C:
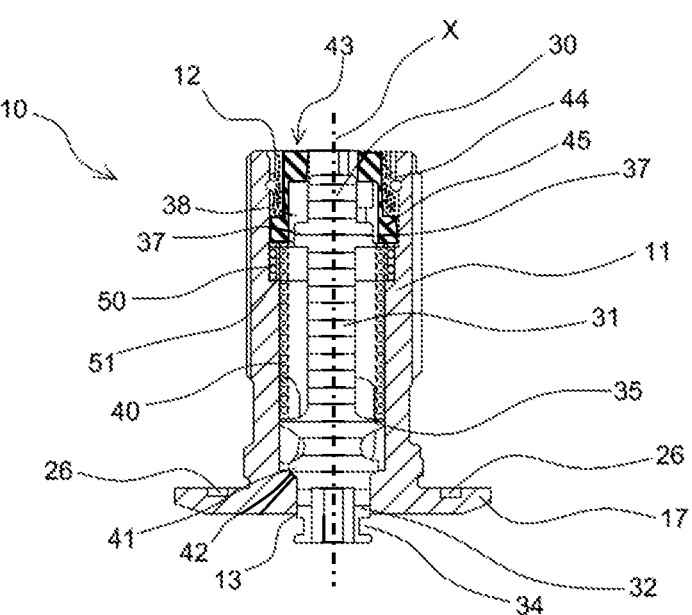
Figure 4:
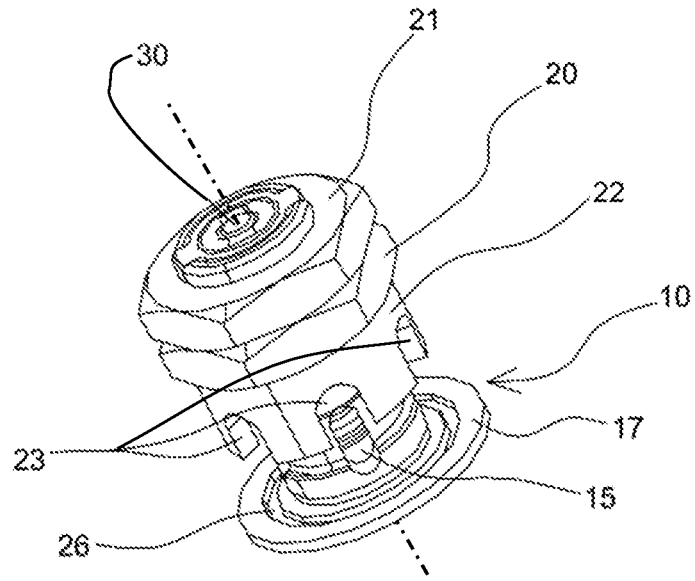
Figure 5:
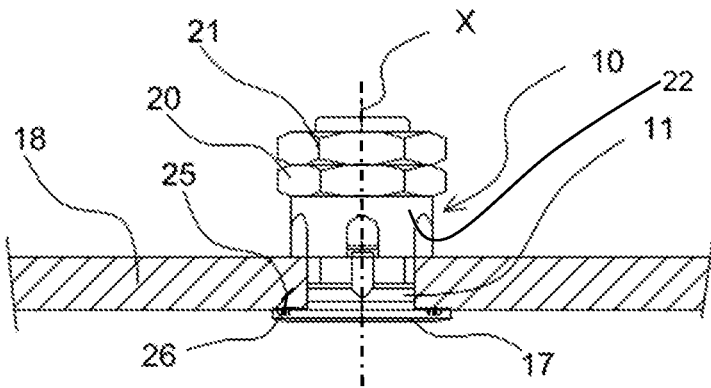
Figure 6:
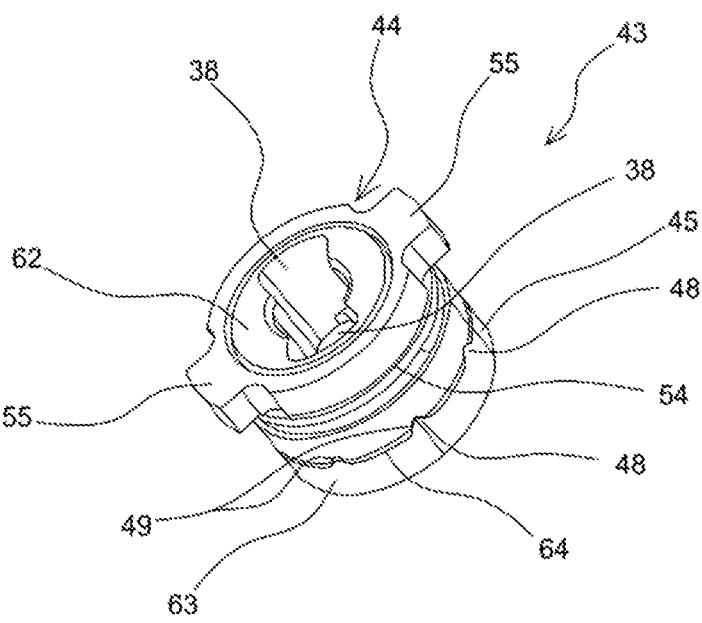
Figure 7:
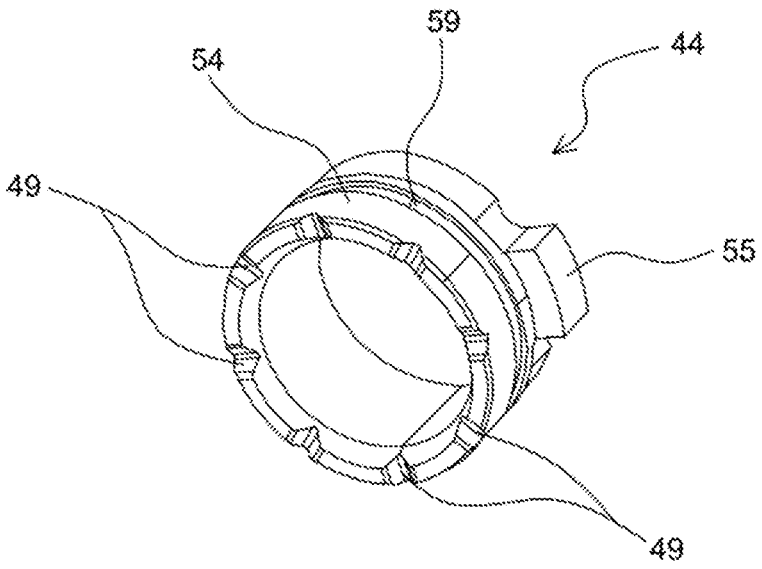
Figure 8:
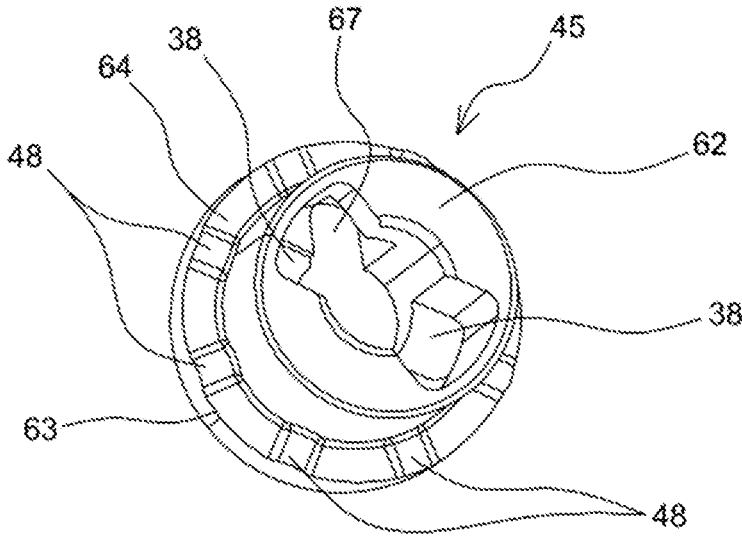

FIG. 3*a* is a longitudinal sectional view of the drain according to the invention in a closed position;

FIG. 3*b* is a longitudinal sectional view of the drain according to the invention in an open position;

FIG. 3*c* is a longitudinal sectional view of the drain according to the invention in a position for replacing a seal;

FIG. 4 is a perspective view of a drain according to the invention associated with a mounting device;

FIG. 5 is a sectional view of a drain according to the invention mounted on a tank wall;

FIG. 6 is a perspective view of a disengaging device integrated into the drain according to the invention;

FIG. 7 is a perspective view of a fixed guide forming the disengaging device in FIG. 6; and FIG. 8 is a perspective view of a movable guide forming the disengaging device of FIG. 6.

It should be noted that in the figures the structural and/or functional elements common to the different embodiments may have the same references. Thus, unless otherwise stated, such elements have identical structural, dimensional and/or material properties.

Relative terms such as "upper" or "lower" are indicated by reference to a drain on a tank, which corresponds in particular to the orientation of the drain shown in FIG. 5.

Figure 1:
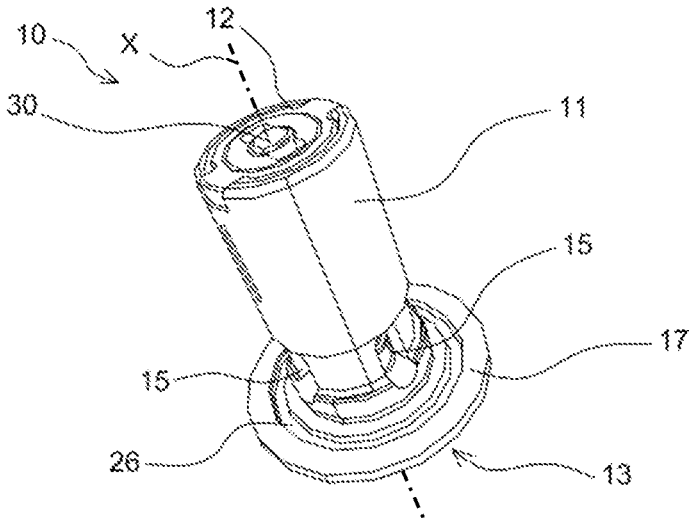
FIG. 1 is a perspective view of a drain according to the invention.
Figure 2:
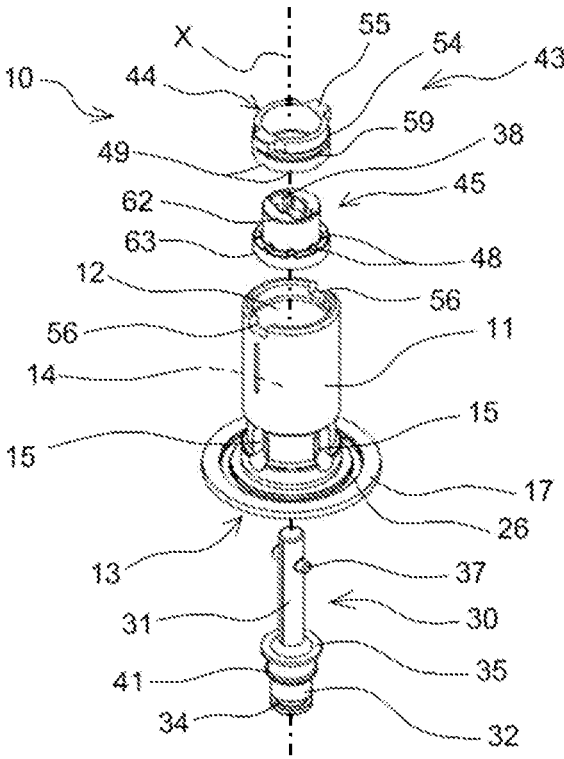
FIG. 2 is an exploded perspective view of a drain according to the invention without the return and pressure springs.

FIG. 1 and FIG. 2 are respectively a perspective view and an exploded perspective view of a drain 10 according to the invention.

The drain 10 comprises a body 11 having an annular shape extending along an extension axis X. The body 11 comprises at least one fluid inlet opening 12, 15 and at least one fluid discharge opening 13.

More specifically, according to the exemplary embodiment presented, the body 11 comprises at least one central opening 12 and at least one lateral opening 15, advantageously several lateral openings 15, as fluid inlet openings 12, 15 capable of allowing fluid inlet.

Furthermore, according to the embodiment shown, the body 11 comprises a discharge opening 13, as a fluid discharge opening 13. The fluid inlet opening 12, 15 and the fluid discharge opening 13, namely the central opening 12, the lateral opening 15 and the discharge opening 13, are in communication with each other via a through channel 14. An end collar 17 is provided so as to bear against an outer face of a tank wall 18, in particular an aircraft tank.

Referring to FIGS. 4 and 5 which are respectively a perspective view of the drain 10 associated with a mounting device and a sectional view of the drain 10 mounted on a tank wall 18, the mounting device permits to ensure that the drain 10 can be mounted on the tank wall 18.

More specifically, the mounting device may comprise a nut 20, a locknut 21 and a spacer 22.

The spacer 22 is arranged around the body 11. More particularly, the spacer 22 has an annular shape extending along the extension axis X. In addition, the spacer 22 may be provided with at least one port 23, preferably several ports 23. In particular, the ports 23 are provided so as to fall into line with the lateral openings 15 in order to define a fluid passage.

The mounting of the drain 10 is ensured by tightening the mounting device with the help of the nut 20 and the locknut 21, such that the tank wall 18 is sandwiched between the spacer 22 and a collar 17 of the body 11 of the drain 10.

In order to ensure the sealing of the assembly of the drain 10, a seal 25 is likely to be arranged inside a groove 26 in one face of the collar 17 of the drain 10 for pressing against an external face of the tank wall 18.

Referring to FIG. 2 and FIG. 3*a* which is a longitudinal sectional view of the drain 10 in a closed position, a valve 30 is mounted so as to move in translation and in rotation relative to the body 11.

For this purpose, the valve 30 extends along an axis coincident with the extension axis X of the body 11.

Furthermore, the valve 30 comprises a stem 31 and a valve head 32 at one end of the stem 31 on the side of the fluid discharge opening 13 of the drain 10 for draining the tank. In addition, the valve 30 may comprise a seal 33, as can be seen in FIG. 3*a*. The seal 33 is arranged inside a groove 34, preferably in an external periphery of the valve head 32.

The drain 10 is able to take:

a closed position, in which the valve head 32 closes the fluid discharge opening 13 in the drain 10, in this case the drainage opening 13 according to the exemplary embodiment presented, which allows drainage of the tank, and an open position, in which the valve head 32 is pushed back relative to the fluid discharge opening 13 in the drain 10, in this case the drainage opening 13 according to the exemplary embodiment presented, which allows drainage of the tank.

In addition, the drain 10 is also able to take a maintenance position, in which replacement of the seal 33 is possible, as explained below.

Furthermore, the valve 30 comprises at least one toe 37. The toe 37 may extend in radial projection relative to an external face of the stem 31 of the valve 30. According to the exemplary embodiment presented, the valve 30 comprises two toes 37 diametrically opposite one another.

The toe 37 is provided so as to cooperate with a receiving housing 38 of corresponding shape in a fixed guide 44 of the valve 30, as described further below.

As can be seen in particular in FIG. 3*a*, the valve 30 may comprise at least one return spring 40. Preferably, the return spring 40 can be arranged between a shoulder 35 of the rod 31 and the body 11 of the drain 10. Alternatively, the return spring 40 can be arranged between the shoulder 35 of the rod 31 and a fixed element relative to the body 11 of the drain 10, such as for example the fixed guide 44 of the valve 30.

The valve 30 may also comprise a sealing shoulder 41. The sealing shoulder 41 is provided so as to come into contact with an internal face 42 of the body 11 of the drain 10. According to an alternative embodiment, the sealing shoulder 41 may have a frustoconical face. In particular, the internal face 42 of the body 11 of the drain 10 may be frustoconical, with a shape corresponding to the frustoconical face of the sealing shoulder 41. Bringing the frustoconical face of the sealing shoulder 41 into contact with the internal face 42 of the body 11 of the frustoconical drain 10 permits to ensure that the drain 10 is sealed when replacing the seal 33.

Reference is now made in particular to FIGS. 3*b* and 3*c* which are longitudinal sectional views of the drain 10 respectively in an open position and in a position for replacing the seal 33 and to FIG. 6 which is a perspective view of a disengaging device 43 integrated into the drain 10.

The disengaging device 43 can be actuated in the event of an overtorque applied to the drain 10 during the drainage operation. For this purpose, the disengaging device 43 comprises the fixed guide 44, capable of being mounted so as to be fixed relative to the body 11, and a movable guide 45, capable of being mounted so as to move, in particular in rotation and in translation, relative to the fixed guide 44.

The movable guide 45 comprises at least one receiving housing 38 for the toe 37. In the example shown, the movable guide 45 comprises two receiving housings 38 diametrically opposite one another for two toes 37 diametrically opposite one another on the stem 31 of the valve 30. Of course, the number of receiving housings 38 is adapted according to the number of toes 37 on the stem 31 of the valve 30.

According to a first embodiment, the fixed guide 44 comprises at least one projection 48. The movable guide 45 comprises at least one recess 49 whose shape is complementary to that of the projection 48.

According to a second embodiment, the movable guide 45 comprises at least one projection 48. The fixed guide 44 comprises at least one recess 49 whose shape is complementary to that of the projection 48.

According to another alternative embodiment, the fixed guide 44 and the movable guide 45 respectively comprise at least one projection 48 and at least one recess 49 whose shape is complementary to that of the projection 48.

As shown in particular in FIGS. 3a to 3c, a pressure spring 50 urges the movable guide 45 against the fixed guide 44 so that the projection 48 cooperates with the correspondingly shaped recess 49.

As presented, the pressure spring 50 bears, on the one hand, against a bearing surface 51, in particular a shoulder, of the body 11, in particular in an internal face of the body 11, and, on the other hand, against an end face of the movable guide 45.

The bearing surface 51 can be defined by a difference in internal diameter of the body 11.

Preferably and as presented in the exemplary embodiment, the disengaging device 43 comprises several projections 48 and several recesses 49. Alternatively, the disengaging device 43 comprises a single projection 48 and several recesses 49.

Advantageously, the disengaging device 43 comprises several recesses 49 with a regular angular distribution.

Thus, when a torque less than a threshold torque is exerted on the valve 30 while the toe 37 is inside the receiving housing 38, a force exerted by the pressure spring 50 forces one or more projections 48 into one or more respective recesses 49. Consequently, the movable guide 45 remains fixed relative to the fixed guide 44.

When a torque greater than the threshold torque, also called overtorque in the present description, is exerted on the valve 30 while the toe 37 is inside the receiving housing 38, the pressure spring 50 is able to compress and no longer constrains the one or more projections 48 in the one or more respective recesses 49 so as to be able to allow rotation of the movable guide 45 relative to the fixed guide 44.

Preferably, the rotation of the movable guide 45 relative to the fixed guide 44 by at least a fraction of a turn is such that the one or more projections 48 can cooperate with one or more respective recesses 49 adjacent to those in which the one or more projections 48 were initially inserted.

The threshold torque value can be adapted according to the setting of the pressure spring 50.

In the case where the disengaging device 43 comprises a single projection 48 and a single recess 49, a 360 degree rotation is achieved when the movable guide 45 is disengaged from the fixed guide 44.

More precisely, as can be seen in FIGS. 2 and 6 and in FIG. 7 which is a perspective view of the fixed guide 44 of the disengaging device 43 in FIG. 6, the fixed guide 44 comprises an annular portion 54, advantageously extending along the extension axis X so as to define a portion in the form of a tubular sleeve, and at least one projecting portion 55, preferably extending radially projecting from annular the portion 54 relative to the extension axis X.

The projecting portion 55 of the fixed guide 44 is provided so as to cooperate with a slot 56 of corresponding shape in the body 11 of the drain 10. Such a configuration permits to ensure that the fixed guide 44 is kept in rotation relative to the body 11 of the drain 10.

In the present case, the fixed guide 44 comprises two projecting portions 55 diametrically opposite one another. Alternatively, the fixed guide 44 may comprise a number of projecting portions 55 greater than two projecting portions or a single projecting portion 55.

According to the embodiment illustrated in FIG. 3a, the fixed guide 44 is held in position relative to the body 11 of the drain 10 by a ring 58 cooperating with at least a first groove 59 and a second groove 60, facing each other, respectively in an external face of the annular portion 54 of the fixed guide 44 and in an internal face of the body 11.

According to the embodiment illustrated in the figures, the fixed guide 44 comprises recesses 49 in one end of the annular portion 54.

Preferably, the recesses 49 are angularly spaced in a regular manner along a circumference of the annular portion 54.

Alternatively, the angular spacing between the recesses 49 is not regular.

As can be seen in FIGS. 2 and 6 and in FIG. 8 which is a perspective view of the movable guide 45 of the disengaging device 43 in FIG. 6, the movable guide 45 comprises a cylindrical portion 62 extending along the extension axis X. More specifically, the cylindrical portion 62 is able to be inserted into a hollow internal space in the fixed guide 44 delimited by the annular portion 54.

Preferably, the receiving housings 38 for the toe 37 are made in the cylindrical portion 62 of the movable guide 45.

In addition, the movable guide 45 may comprise an annular shoulder 63 extending radially from an external face of the cylindrical portion 62.

According to the embodiment illustrated in the figures, the movable guide 45 comprises projections 48 on an upper face 64 of the annular shoulder 63, opposite the end of the annular portion 54 comprising the recesses 49.

The upper face 64 extends in a radial plane relative to the extension axis X. Preferably, the projections 48 are angularly spaced in a regular manner along a circumference of the cylindrical portion 62. Alternatively, the angular spacing between the projections 48 is not regular.

The projections 48 and recesses 49 have complementary shapes which may be rounded, in particular such as a semicircle, triangular, rectangular, square, or any other shape suitable for the application.

As it is particularly visible in FIG. 8, at least one through opening 67 is provided in the cylindrical portion 62. More particularly, the through opening 67 is angularly offset relative to the one or more receiving housings 38 for the one or more respective toes 37. The through opening 67 is provided in a face axially offset by a few millimeters relative to the bottom of the receiving housing 38 for the toe 37.

The through opening 67 allows the passage of the corresponding toe 37 so as to allow the drain 10 to pass into the maintenance position.

The various components of the drain 10 may be made of a plastic material. Alternatively, the components of the drain

10 may be made of a metallic material, a composite material, or any other material suitable for the application.

In the case of normal operation, a transition from the closed position, illustrated in FIG. 3a, to the open position, illustrated in FIG. 3b, is carried out manually by an axial push along the extension axis X followed by a rotation of the valve 30.

More specifically, the operator performs:

an axial push along the extension axis X of the valve 30 in order to push the valve head 32 back relative to the fluid discharge opening 13 and to disengage the toe 37 the receiving housing 38, then a rotation by a fraction of a turn, in particular 90 degrees, of the valve 30 by applying a torque to the valve 30 so that the toe 37 is angularly offset relative to the receiving housing 38 so as to bear against the end face of the movable guide 45.

The return spring 40 is then in a compressed state. The valve head 32 is moved away from the fluid discharge opening 13. The drain 10 is then in a stable open position allowing drainage of the tank, as shown in FIG. 3b.

To bring the drain 10 back to the closed position, the operator performs a reverse rotation by a fraction of a turn until the toe 37 falls into line with the receiving housing 38. The return spring 40 can then decompress so as to move the toe 37 against the bottom of the receiving housing 38. The valve head 32 then closes the fluid discharge opening 13. The drain 10 is then in the stable closed position, as shown in FIG. 3a.

When an overtorque is applied to the valve 30 while the toe 37 is still inside the receiving housing 38 due to an incorrect operation by the operator, the movable guide 45 can move back slightly relative to the fixed guide 44 by compressing the pressure spring 50 and rotate by a fraction of a turn relative to the fixed guide 44. The projections 48 then cooperate with recesses 49 angularly adjacent to the recesses 49 in which the projections 48 were initially inserted.

Such manipulation thus permits to absorb the excess torque without any risk of breaking the internal mechanism of the drain 10. When the movable guide 45 moves relative to the fixed guide 44, the drain 10 remains in the closed position.

To move the drain 10 from the closed position, illustrated in FIG. 3a, to a maintenance position, illustrated in FIG. 3c, the operator pushes the valve 30 by a few millimeters until the toe 37 is at the same level as the face of the movable guide 45 in which the through opening 67 of corresponding shape is provided.

The operator then rotates the valve 30, so that the toe 37 falls into line with the corresponding through opening 67. The return spring 40 then decompresses until the frustoconical face of the sealing shoulder 41 bears against the frustoconical face 42 of corresponding shape in the body 11.

In such a configuration, the valve head 32 extends outside the body 11. The operator can then replace the seal 33 around the valve head 32 which is then accessible.

By a reverse operation of pushing the valve 30 axially and rotating it so as to make the toe 37 cooperate with the receiving housing 38, the operator returns the drain 10 to the closed position.

The invention also relates to an aircraft tank comprising a drain 10 according to the invention and an aircraft comprising such a tank.

Of course, the different characteristics, variants and/or embodiments of the present invention may be associated with each other in various combinations insofar as they are not incompatible with or exclusive of one another.

Furthermore, the invention is not limited to the embodiments described above and provided solely by way of example. It encompasses various modifications, alternative forms and other variants which a person skilled in the art may envisage in the context of the present invention and in particular any combination of the various operating modes described above may be taken separately or in combination.

The invention claimed is:

1. Drain comprising:
   a body having at least one fluid inlet opening and at least one fluid discharge opening;
   a valve mounted so as to move in translation and in rotation relative to the body, the valve comprising at least one toe;
   a disengaging device comprising:
   a fixed guide, capable of being mounted so as to be fixed relative to the body;
   a movable guide, comprising at least one receiving housing for the at least one toe;
   wherein one element chosen among the fixed guide and the movable guide comprises at least one projection and the other element chosen among the fixed guide and the movable guide comprises at least one recess whose shape is complementary to that of the at least one projection; and
   a pressure spring, capable of urging the movable guide against the fixed guide so that the at least one projection cooperates with the at least one recess, so that the pressure spring is able to be compressed so as to allow the movable guide to rotate relative to the fixed guide, when an overtorque is applied to the valve while the at least one toe is still inside the at least one receiving housing.

2. The drain according to claim 1, wherein a return spring is arranged between a shoulder of the valve and the movable guide.

3. The drain according to claim 1, wherein the fixed guide comprises at least one projecting portion for cooperating with a slot of corresponding shape in the body.

4. An aircraft tank comprising a drain according to claim 1.

5. An aircraft comprising an aircraft tank comprising a drain according to claim 1.

6. The drain according to claim 1, wherein the movable guide comprises a cylindrical portion inserted into a hollow internal space in the fixed guide and comprising the at least one receiving housing for the at least one toe.

7. The drain according to claim 6, wherein the at least one projection is made on an upper face of the annular shoulder of the movable guide.

8. The drain according to claim 6, wherein the cylindrical portion of the movable guide comprises at least one through opening angularly offset relative to the at least one receiving housing for the at least one toe.

9. The drain according to claim 1, wherein the fixed guide comprises an annular portion and in that the at least one recess is provided in one end of the annular portion of the fixed guide.

10. The drain according to claim 9, wherein an external face of the annular portion of the fixed guide and an internal face of the body respectively comprise a first groove and a second groove facing each other.

11. The drain according to claim 10, wherein a rod cooperates with the first groove and the second groove.

12. The drain according to claim 11, wherein the movable guide comprises an annular shoulder extending radially from an external face of the cylindrical portion.

\* \* \* \* \*